US005671788A

United States Patent [19]
Rewis

[11] Patent Number: 5,671,788
[45] Date of Patent: Sep. 30, 1997

[54] TREE AND STUMP EXTRACTOR

[76] Inventor: Rudy Rewis, Rte. 2, Box 412, Hortense, Ga. 31543

[21] Appl. No.: 604,574

[22] Filed: Feb. 21, 1996

[51] Int. Cl.$^6$ ............................ A01G 23/06; A01G 23/08
[52] U.S. Cl. ................... 144/34.1; 37/302; 144/24.12; 144/334
[58] Field of Search ................ 144/34.1, 24.12, 144/334, 335; 37/302

[56] References Cited

U.S. PATENT DOCUMENTS

| | | | |
|---|---|---|---|
| 3,851,686 | 12/1974 | Hultdin et al. | 144/334 |
| 3,989,075 | 11/1976 | Coughran, Jr. | 37/302 |
| 4,067,369 | 1/1978 | Harmon | 37/302 |
| 4,141,398 | 2/1979 | Widegren et al. | 144/24.12 |
| 4,481,989 | 11/1984 | Peters | 144/24.12 |

FOREIGN PATENT DOCUMENTS 2437775  4/1980  France ................ 37/302

*Primary Examiner*—W. Donald Bray
*Attorney, Agent, or Firm*—Thomas C. Saitta

[57] ABSTRACT

A method and apparatus for extracting a tree trunk, stump and main root from the ground while simultaneously severing the lateral roots, where the tree trunk is gripped by gripping members which are raised vertically to pull the stump and main root through generally annular root shearing members encircling the base of the tree trunk. The root shearing members remain stationary during the extraction operation. Preferably scraping members are positioned adjacent to the root shearing members to remove any dirt and debris.

14 Claims, 3 Drawing Sheets

TREE AND STUMP EXTRACTOR

BACKGROUND OF THE INVENTION

This invention relates to an apparatus and method for extracting a tree from the ground for lumber harvesting purposes. More particularly, it relates to extracting the tree and stump, including the main tap root, from the ground while simultaneously shearing the lateral roots and removing dirt and debris from the around the main root and stump.

Extracting a tree from the ground involves one of several techniques. If the tree is to be replanted, then the tree, stump and most of the root system and contacting soil, known as the root ball, must be removed intact for transfer to another location. Apparati for accomplishing this task typically involve digger or blade type devices which cut into the soil at points surrounding the tree, the blades angling down to meet beneath the root ball. This earthen plug containing the tree and roots is then lifted, transported to the desired site and placed into a hole. In harvesting situations, where the tree is to be later processed into various wood products such as lumber or pulp wood, the usual method is to cut the tree at ground level, leaving the stump and roots in the soil. A problem with this method is that, especially in the case of harvesting pines to be ground into pulp wood, a significant portion of useable wood is left in the ground, possibly as much as 10 percent or more of the total wood available from each tree. This is because the tree produces a large main or tap root directly beneath and coaxially aligned with the tree trunk. For example, a 12 inch diameter pine tree may have a tap root extending as much as 3 feet or more into the ground. A secondary problem with the typical harvesting method is that the stumps and roots left in the harvested field can impair replanting of the field, often resulting in the need to excavate the stumps or grind down their upper portions. If the harvested field is to be used for planting other crops, then the stumps and roots must be removed.

Various devices have been developed to remove stumps after the truck has been severed, and typically comprise either means to grip the stump above ground or means to pass blades beneath the stump in the ground, combined with power means to raise the stump vertically. This method removes the stump, roots and all the dirt and debris contained by the roots. See for example U.S. Pat. No. 3,110,477 to Campbell, U.S. Pat. No. 3,760,515 to Morgan, or U.S. Pat. No. 3,974,925 to McKenzie. This technique is not suitable for harvesting pine trees, since the cost and time required to clean the dirt and debris from the root system outweighs the value of the extra wood obtained. A better attempt is shown in U.S. Pat. No. 3,958,613 to Herz, which teaches a device and method for removing a tree and its main root while simultaneously vibrating the tree and root to shake loose dirt and debris. The device comprises a mobile power source, clamp means to grip the tree, vibratory means to vibrate the tree and lifting means to extract the tree and roots from the ground. Herz also teaches the use of an annular shear which is forced into the ground to shear the lateral roots. To sever the lateral roots, the shear is forced into the earth and then removed prior to gripping and extracting the tree. A drawback to this apparatus is that the root shearing means must be forced into the earth, which may be difficult in tightly packed ground or in locations where rocks and stones are present. Additionally, the use of vibration to shake loose dirt and debris may not result in removal of all the dirt and debris, and the vibratory nature of the apparatus makes operation difficult and will likely result in the need for frequent maintenance on the apparatus.

It is an object of this invention to provide a method and an apparatus for extracting a tree, stump and vertically depending main root simultaneously, especially a tree such as a pine which is harvested with relatively small diameter trunks generally linear near the ground. It is a further object to provide such a method and apparatus which comprises means to grip the tree and means to lift the tree generally vertically through stationary root shearing means positioned at ground level to shear the lateral roots, while concurrently scraping dirt and debris from around the main root.

SUMMARY OF THE INVENTION

The invention comprises in general a method and apparatus for extracting from the ground a tree trunk, its stump and main depending root, while simultaneously shearing the lateral roots and removing dirt and debris clinging to the extracted main root. The apparatus comprises in general a mobile power source means capable of operation in relatively rough terrain, such as a tractor, skidder, front end loader or similar heavy duty vehicle well known in the tree harvesting industry, and capable of delivering power through hydraulics or the like to various operating means for extraction of the tree, the apparatus having means to grip the tree trunk, means to raise or lift the gripping means and the tree trunk generally vertically to extract the stump and roots from the ground, root shearing means adapted to encircle the tree trunk at or near ground level, and debris scraping means to remove dirt and debris from around the extracted stump and vertically depending root. During extraction the root shearing means remains stationary at ground level, such that the stump and main root are pulled through the shearing means in order to shear the lateral roots.

Preferably, the operating means are mounted onto the front of the power source vehicle such that they can be raised several feet off the ground to provide for easy movement of the vehicle in rough terrain to reach the trees to be harvested. The shearing means is comprised of plural components which open to allow it to receive a tree such that it will encircle the tree when closed with relatively small clearance, and is preferably mounted onto a relatively sturdy ground plate which can be lowered onto the ground once the shearing means has been closed around the tree. The gripping means are then closed to grasp the tree a distance above ground level and the vertical lifting means are activated to raise the gripping means. The vertical lifting means may utilize pivoted arms or, preferably, a vertically extending system similar to a forklift mechanism. This causes the tree stump and roots to be extracted from the ground and pulled through the stationary shearing means, which cuts the relatively smaller lateral roots. At the same time, scrapping means mounted adjacent to the shearing means, which may comprise a number of tension mounted bars, act as fingers to scrape dirt and debris from the main root. Once the tree has been lifted a sufficient distance to remove the main root from the ground, typically about 3 to 4 feet, the shearing means and gripping means are opened and the tree is released to fall to the ground.

DETAILED DESCRIPTION OF THE INVENTION

The method and apparatus will now be described in detail with regard for the best mode and preferred embodiment, with reference to the drawings. The method and apparatus are for use in harvesting trees having a vertically depending main tap root with a number of much smaller lateral roots, and is particularly suitable for harvesting pine trees with trunk diameters up to 12 inches or more. In general, the method comprises the first step of providing an apparatus having gripping means to grasp a tree trunk, raising means to lift the gripping means and tree vertically out of the ground, root shearing means which remain stationary relative to ground level, and scraping means to remove dirt and debris from the extracted roots. The method then comprises positioning the root shearing means and scraping means to encircle the tree trunk at or near ground level, grasping the tree with the gripping means, raising the gripping means and tree vertically to extract the tree, stump and root from the ground such that the shearing means cuts the lateral roots and the scraping means removes dirt and debris from extracted root. Further steps comprise tilting the gripping means away from the power source vehicle and opening the shearing means, scraping means and gripping means to release the tree to the ground.

Figure 1:
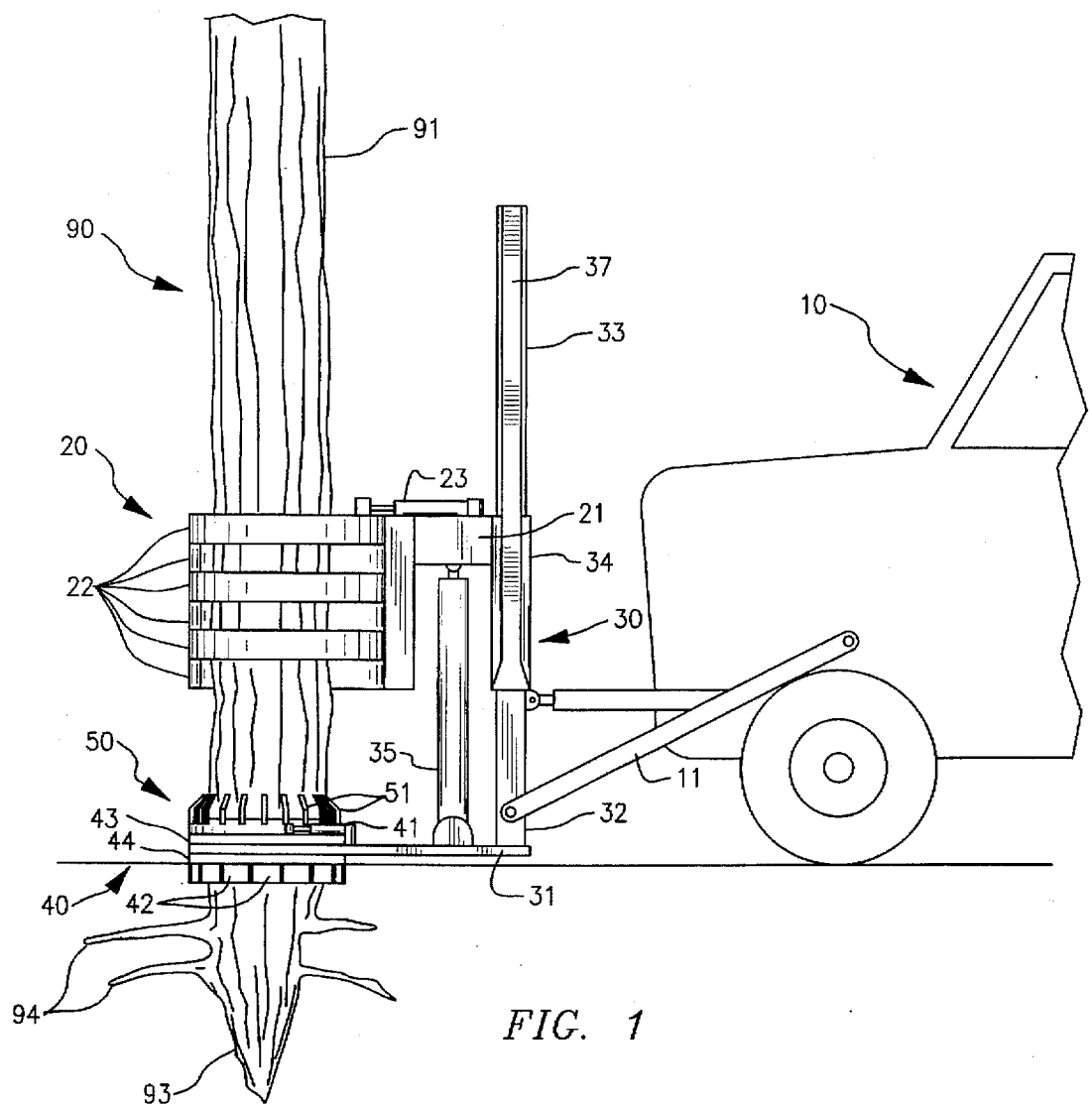
FIG. 1 is a side view of the apparatus of the invention, showing the apparatus gripping the tree but prior to extraction of the tree.
Figure 2:
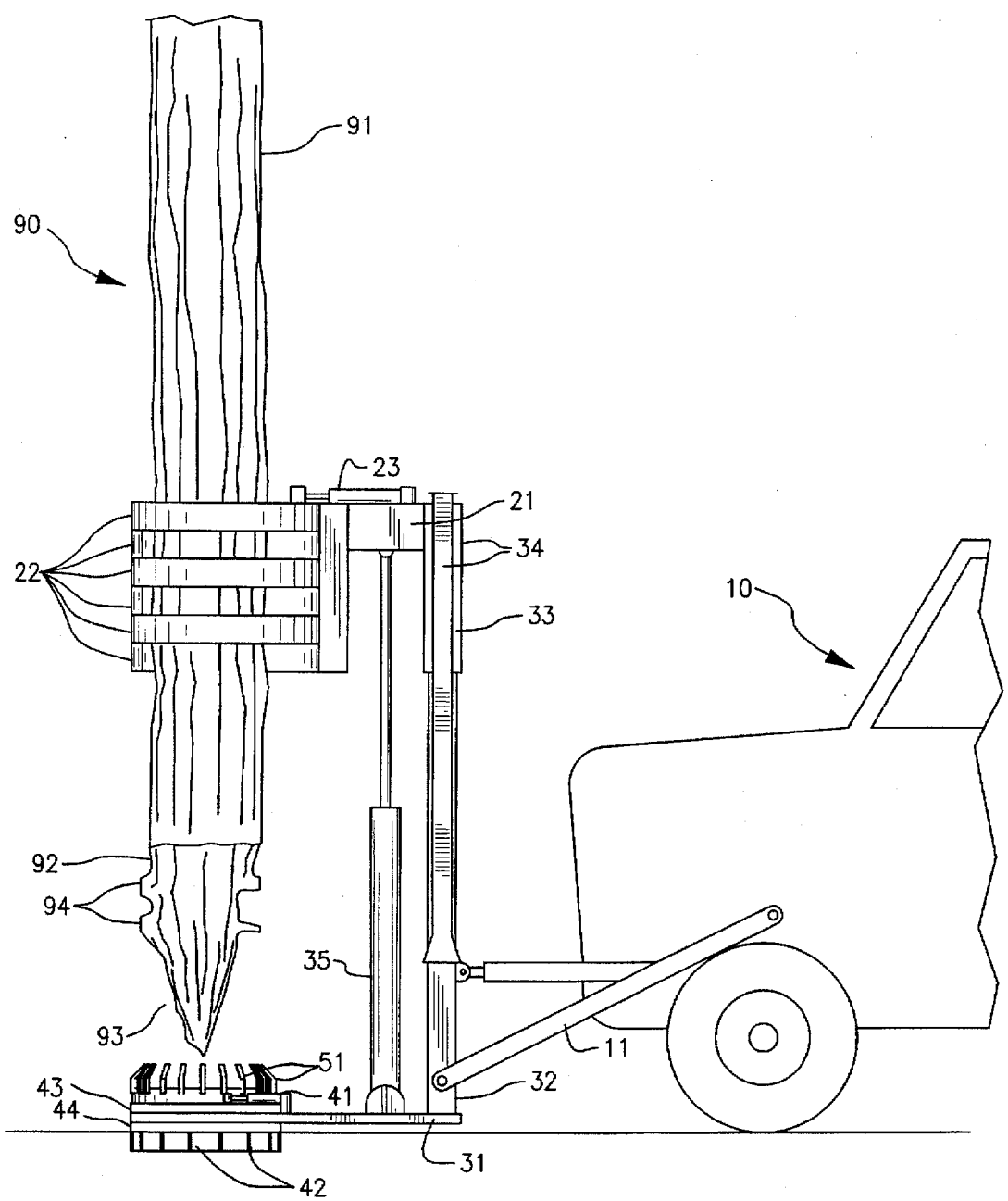
FIG. 2 is a side view of the apparatus, showing the apparatus having extracted the tree, stump and main root from the ground.
Figure 3:
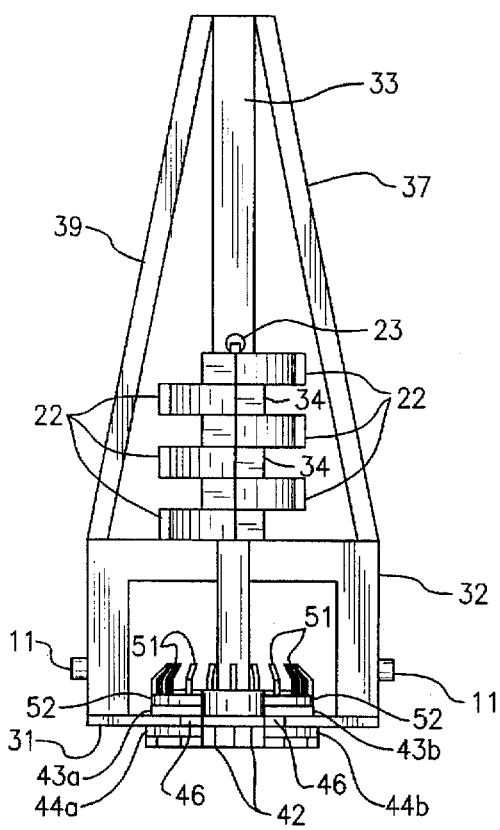
FIG. 3 is a front view of the apparatus with the power source vehicle removed for clarity.

With reference to the drawings, the apparatus will now be described. Referring to FIGS. 1, 2 and 3, the apparatus is shown to generally comprise mobile power source vehicle means 10 and tree extracting operating components which comprise tree trunk gripping means 20, vertical lifting or raising means 30, lateral root shearing means 40 and dirt scraping means 50. The mobile power source vehicle means 10 may be of any known type of mobile heavy duty equipment equipped with a source of hydraulic power for powering the tree extracting operating components, such as for example a diesel powered tractor, skidder, front end loader or the like. The vehicle 10 is provided with means 11, such as a pair of hydraulic lift arms, to raise the tree extracting operating components a short distance above the ground to allow the vehicle 10 to traverse uneven or difficult terrain to reach the trees to be harvested and to allow the vehicle to carry an extracted tree 90 to a different location before it is released.

The lift arms 11 are pivotally connected to a ground plate 31 which acts as the main base for the operating components and is adapted to be positionable directly onto the ground during the extraction operation. Ground plate 31 is a generally planar, high-strength, rigid member composed of steel plate or the like. The lift arms 11 are connected directly to a lower brace member 32 which extends vertically from the rear of the ground plate 31 and across laterally to an upstanding post member 33 centrally positioned between the lift arms 11. Post member 33 is a component of raising means 30 and is preferably a square tube or column rigidly affixed in a vertical manner to ground plate 31 and extending to a height preferably of approximately 7 to 9 feet and further supported by upstanding brace members 37. Surrounding post member 33 is sleeve member 34 which is adapted to slide vertically on post member 33, reciprocating from a stopped lower position, as shown in FIG. 1, to a raised extended position, as shown in FIG. 2. Movement of sleeve member 34 is preferably accomplished by a hydraulically operated lift piston 35 mounted vertically on the ground plate 31 and communicating hydraulically with the power source means 10. The lift piston 35 is connected directly to the sleeve member 34 or to the horizontal support member 21 for the gripping means 20. In this manner the gripping means 20, which are connected to sleeve member 34, are raised and lowered in conjunction with the movement of sleeve member 34. The lift piston 35 must be of sufficient power to extract the tree 90 from the ground. It is contemplated that raising means 30 may comprise equivalent components which operate in similar or different manner to raise the gripping means 20, such as for example by providing separate pivoted arms, chain drive or screw drive components to raise the gripping means 20 while simultaneously maintaining the ground plate 31 and shearing means 20 stationary at ground level.

The gripping means 20 may comprise any known mechanism for securely grasping the tree trunk 91. Preferably, the gripping means 20 is hydraulically operated, and as shown comprises at least two but preferably more pivoting opposing bar members 22 which are adapted to close around trunk 91 with sufficient gripping power to compact the contacted area such that the bar members 22 will not slip when the tree 90 is raised by raising means 30. The bar members 22 are preferably slightly curved to better grip the cylindrical tree trunk 91. The bar members 22 are mounted onto the support member 21 to extend sufficient distance to the front of the apparatus to align with the ground plate inset 36 and shearing means 40, and such that one set of bar members 22 opens outwardly to one side while the second set of bar members 22 opens outwardly to the other side to receive the tree trunk 91. Once each set of bar members 22 is positioned to each side of the trunk 91, the bar members 22 are hydraulically closed by one or more grip pistons 23 to securely grasp the trunk 91, the pistons 23 hydraulically communicating with the power source means 10. When the tree 90 is to be released after it has been extracted, the bar members 22 are hydraulically opened.

Figure 4:
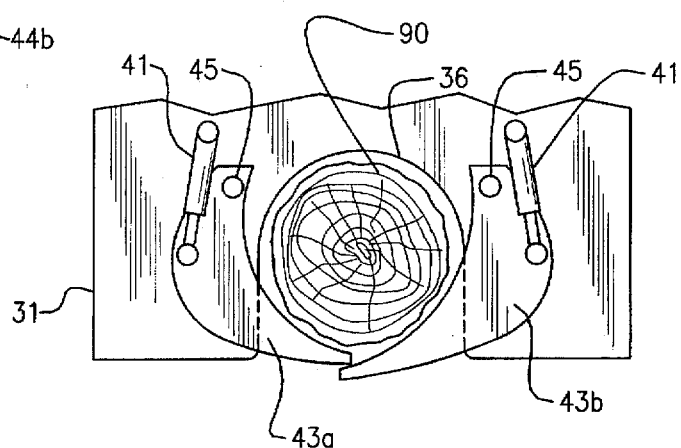
FIG. 4 is a top view of the shearing means, with the scraping means removed for clarity.
Figure 5:
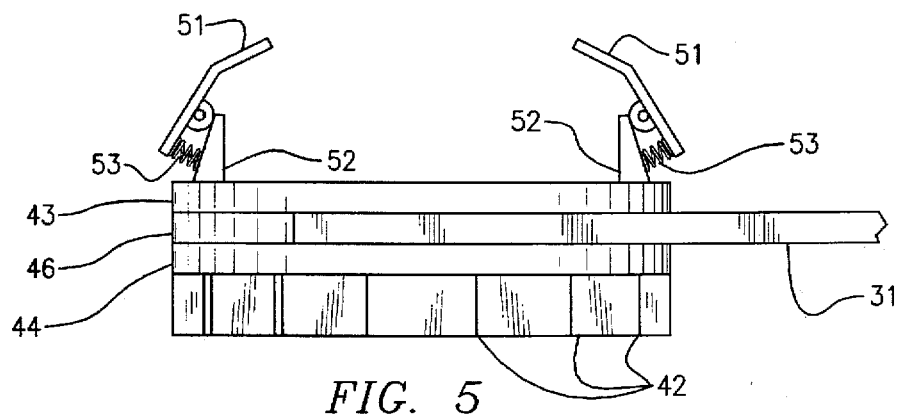
FIG. 5 is a side view showing the shearing means and two of the scraping means in an exposed manner.

Root shearing means 40 are mounted onto the front of ground plate 31 and are positioned to encircle the tree trunk 91 at a point on or near ground level. Root shearing means 40 comprise multiple components which provide an open configuration around ground plate inset 36 to receive the tree trunk 91, as shown in FIG. 3, and are preferably automatically positionable by one or more shearing pistons 41 to completely encircle the tree trunk 91. Shearing means 40 provides a generally annular cutting or shearing surfaces or blades 42 which cut any lateral roots 94 extending from the main root 93 when the tree 90 is lifted out of the ground. Shearing means 40 must be suitably mounted to ground plate 31 to provide sufficient resistance to the upward force exerted against it by raising means 30. In the embodiment shown, shearing means 40 comprises a pair of upper plates 43a and 43b and a pair of lower plates 44a and 44b which are pivotally mounted to ground plate 31 by pins 45. As seen in FIGS. 4 and 5, the upper plates 43 and lower plates 44 are configured to extend partially into and around the ground plate inset 36, with upper plate 43a and lower plate 44a mounted to one side of ground plate inset 36 and upper plate 43b and lower plate 44b mounted to the other side. The upper and lower plates 43 and 44 are pivoted outwardly and inwardly by shearing pistons 41 hydraulically communicating with the power source means 10, the plates 43 and 44 opening to receive the trunk 91 and closing to encircle the trunk 91 in combination with the ground plate insert 36, in order to shear any and all the lateral roots 94. At locations on the free ends beyond the extent of ground plate 31, the set of plates 43a and 44a and the set of plates 43b and 44b are mechanically joined by bridging members 46, which may comprise pins or a welded plate. Depending from the lower plates 44 are curved blades 42, which may comprise a bevelled or sharpened flange or a number of laterally conjoined curing members. Depending from the rear side of the ground plate insert 36 are additional blades 42, which when combined with the depending blades 42 connected to the pivoting lower plates 44, provide a generally annular shearing surface surrounding the entire tree trunk 91.

The shearing means 40 is preferably configured to allow the device to be used for tree trunks of varying diameters, such that the set of upper and lower plates 43a and 44a will close before the set of upper and lower plates 43b and 44b, as shown in FIG. 4. In this manner the shearing blades 42 will be brought into close proximity to the tree trunk 91 no matter what the particular trunk dimension is, since one set of pivoting shearing blades 42 will overlap the second set of pivoting blades 42.

When the tree 90 is extracted, a good amount of dirt and debris will remain attached to the stump 92 and main tap root 93 even after the lateral roots 94 are sheared off. To prevent the need for a subsequent cleaning operation, the apparatus is provided with dirt scraping means 50. As shown in FIGS. 1-3 and 5, the scraping means 50 comprises a plural number of independently moveable scrapper fingers or rods 51, which are spring mounted onto mounting flanges 52 generally adjacent the root shearing means 40. The mounting flanges 52 are connected to the ground plate 31 around the rear of the inset 36 and are connected to each of the upper plates 43, such that the scrapper rods 51 will encircle the tree trunk 91 when the shearing means 40 is properly positioned. Spring members 53 force the scrapper rods inward to contact the tree trunk 91. As the trunk 91, stump 92 and main root 93 are drawn through the shearing means 40, the ends of the scrapper rods 53 will be kept in continual contact by the springs 53 as the diameter of the tree 90 changes. In this manner, any dirt or debris remaining on the stump 92 or main root 93 will be knocked loose by the scrapper rods 51.

To release the tree after it has been extracted, the ground plate 31 is lifted by the lift arms 11 of the power source vehicle 10. The gripping means 20 are angled away from the vehicle 10 and the shearing means 40, scrapping means 50 and gripping means 20 are opened. As shown in FIGS. 1 and 2, one mechanism to accomplish this is to provide for one or more tilting pistons 61 attached between one or both lift arms 11 and the lower brace member 32. Extending the hydraulic piston 61 causes the operating components to pivot about the juncture between the lift arms 11 and the lower brace member 32, tilting the upper part forward such that the tree 90 will fall forward when released. It is contemplated that other mechanisms could be employed, such as for example a push ram mounted adjacent the gripping means which forces the tree 90 away from the vehicle 10 when actuated.

To extract a tree 90, the vehicle 10 is driven to the tree with the operating in the raised position such that the ground plate 31 is off the ground. The ground plate 31 is lowered to a point slightly above ground level and the ground plate inset 36 is butted against the trunk 91. The shearing means 40 is then actuated to encircle the tree trunk 91 with the shearing blades 42. The ground plate 31 is then lowered completely to the ground to provide support for the extraction. The shearing means 40 is closed before the ground plate 36 is fully lowered to insure that no ground obstructions will prevent the plates 43 and 44 from closing fully around the tree trunk 91. The gripping means 20 are then actuated to securely grasp the tree trunk 91. This position is shown in FIG. 1. To extract the tree 90, the raising means 30 is actuated and the tree 90 is pulled from the ground. When the raising means 30 is activated, the ground plate 31 will be pressed against the ground and the shearing blades 42 may be pressed a short distance into the ground, but this is not required. The tree stump 92 and main tap root 93 are pulled through the stationary shearing means 40, which sever all the lateral roots 94. The scrapper means 50 knock loose any dirt and debris clinging to the stump or tap root as they are pulled upward. When the tree 90 has been fully extracted, as shown in FIG. 2, the lift arms 11 are raised to once again provide clearance between the ground plate 31 and the ground. The extracted tree 90 can then be driven to the stacking location and released by actuating the tilt pistons 61 to lean the gripping means 20 forward. Opening the shearing means 40 and gripping means 20 then releases the tree forward to the ground.

It is understood that equivalents and substitutions for certain elements and components may be obvious to those skilled in the art, and therefore the true scope and definition of the invention is to be as set forth in the following claims.

I claim:

1. An apparatus for simultaneously extracting a tree trunk, stump and main root from the ground and removing lateral roots, said apparatus comprising a mobile power source vehicle to provide power to tree extraction operating means comprising a ground plate connected to said mobile power source means such that said ground plate can be raised from and lowered onto the ground, gripping means movably mounted on said ground plate to securely grasp a tree trunk, adjustable root shearing means connected to said ground plate to encircle said tree trunk at its base and shear any lateral roots, where said root shearing means are connected to said ground plate such that there is no relative vertical movement between said root shearing means and said ground plate, and raising means mounted on said ground plate and connected to said gripping means to vertically move said gripping means relative to said ground plate and said root shearing means such that said tree trunk, stump and main root are pulled through said ground plate and said root shearing means and said ground plate and said root shearing means remain stationary on the ground.

2. The apparatus of claim 1, further comprising scraping means to encircle said tree trunk to remove dirt and debris from said stump and main root.

3. The apparatus of claim 1, where said raising means comprises a post member supported by said ground plate and a hydraulically operated sliding sleeve member connected to said gripping means.

4. The apparatus of claim 1, where said root shearing means comprises independently pivotable plural plates having blades depending therefrom, where one of said plates is pivotable inside another of said plates such that said blades tightly encircle said tree trunk regardless of the size of said tree trunk.

5. The apparatus of claim 4, where said gripping means comprises opposing bar members adapted to open and close around said tree trunk hydraulically.

6. The apparatus of claim 1, where said gripping means comprises opposing bar members adapted to open and close around said tree trunk hydraulically.

7. The apparatus of claim 4, where said root shearing means further comprises blades fixidly connected to said ground plate.

8. The apparatus of claim 1, where said root shearing means comprises blades fixedly connected to said ground plate and a pair of independently pivotable plural plates having blades depending therefrom, where said plates may be pivoted such that said blades encircle said tree trunk.

9. The apparatus of claim 8, where one of said plates is pivotable inside the other of said plates.

10. A method of simultaneously extracting a tree trunk, stump and main root from the ground while removing any lateral roots, the method comprising the steps of providing tree trunk gripping means, root shearing means connected to a ground plate such that there is no relative vertical movement between said root shearing means and said ground plate, and raising means mounted on said ground plate to vertically move said gripping means, then placing said ground plate adjacent said tree trunk, gripping said tree trunk with said gripping means, encircling said tree trunk at its base with generally annular root shearing means, and raising said gripping means and said tree trunk to pull said stump and main root through said root shearing means and said ground plate where said root shearing means and said ground plate remain stationary on the ground.

11. The method of claim 10, where said root shearing means comprise a pair of independently pivotable plates having blades depending therefrom, and where the step of encircling said tree trunk is performed by closing one of said plates inside of the other of said plates.

12. The method of claim 10, further comprising providing scraping means to remove dirt from said stump and main root when said stump and main root are pulled through said root shearing means.

13. The method of claim 10, further comprising providing a mobile power source vehicle to operate said gripping means, said root shearing means and said raising means, transporting said vehicle to said tree trunk, lowering said root shearing means to the ground after encircling said tree trunk, raising said root shearing means from said ground after said stump and main root have been pulled through said root shearing means, transporting said tree trunk, stump and main root to a different location, and opening said shearing means and said gripping means to release said tree trunk.

14. An apparatus for simultaneously extracting a tree trunk, stump and main root from the ground and removing lateral roots, said apparatus comprising a mobile power source vehicle to provide power to tree extraction operating means comprising gripping means to securely grasp a tree trunk, root shearing means to encircle said tree trunk at its base and shear any lateral roots, raising means to vertically move said gripping means relative to said root shearing means such that said tree trunk, stump and main root are pulled through said root shearing means, and scraping means to encircle said tree trunk to remove dirt and debris from said stump and main root.

\* \* \* \* \*